United States Patent [19]

Levand, Jr. et al.

[11] 4,155,736

[45] May 22, 1979

[54] METHOD OF MAKING A NON-SHORTING PHOTOFLASH LAMP

[75] Inventors: Victor A. Levand, Jr., Lyndhurst; Robert M. Anderson, Pepper Pike, both of Ohio

[73] Assignee: General Electric Company, Schenectady, N.Y.

[21] Appl. No.: 855,423

[22] Filed: Nov. 28, 1977

Related U.S. Application Data

[62] Division of Ser. No. 746,397, Dec. 1, 1976, abandoned.

[51] Int. Cl.[2] .............................................. C03C 27/02

[52] U.S. Cl. ...................................... 65/59 R; 65/138; 65/140

[58] Field of Search .................. 65/138, 140, 34, 59 R

[56] References Cited

U.S. PATENT DOCUMENTS

| | | | |
|---|---|---|---|
| 3,260,583 | 7/1966 | Eisler | 65/140 X |
| 3,816,054 | 6/1974 | Baldrige et al. | 431/95 |
| 3,897,196 | 7/1975 | Saunders et al. | 431/95 |
| 3,919,750 | 11/1975 | Saunders et al. | 65/59 X |
| 3,941,555 | 3/1976 | Anderson et al. | 431/95 |

*Primary Examiner*—Arthur D. Kellogg
*Attorney, Agent, or Firm*—Norman C. Fulmer; Lawrence R. Kempton; Frank L. Neuhauser

[57] ABSTRACT

A glass support bead through which lead-in wires extend within a miniature type of flash lamp is shaped to have a raised narrow ridge extending between the lead-in wires so that when the lamp flashes the lead-in wires will melt back at the sides of the raised ridge of the support bead. The support bead is formed by shaping jaws which squeeze against the heat-softened bead material to form the raised narrow ridge.

5 Claims, 6 Drawing Figures

Fig. 1
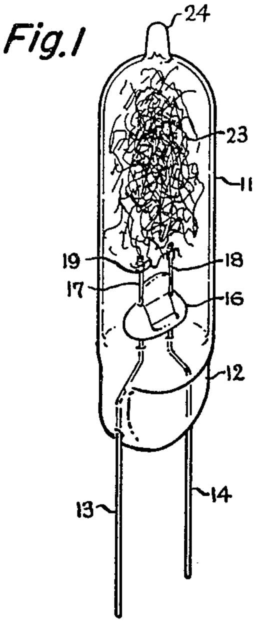
Fig. 2
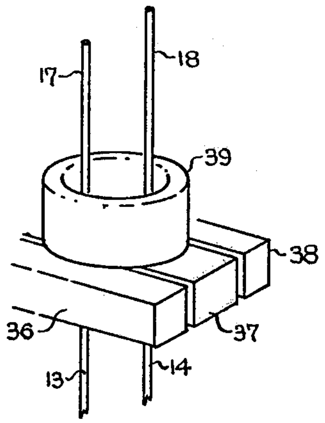
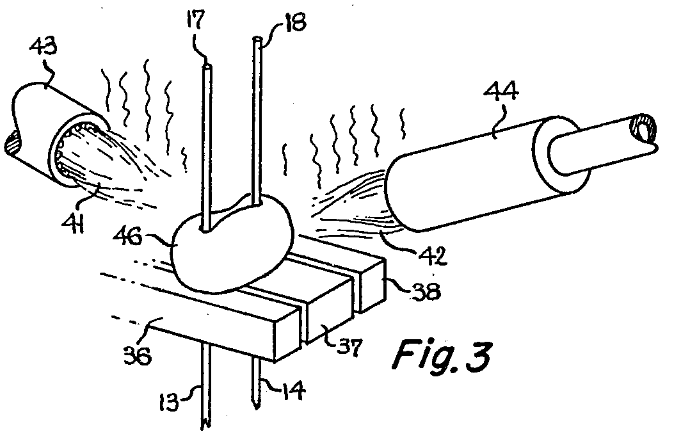
Fig. 3
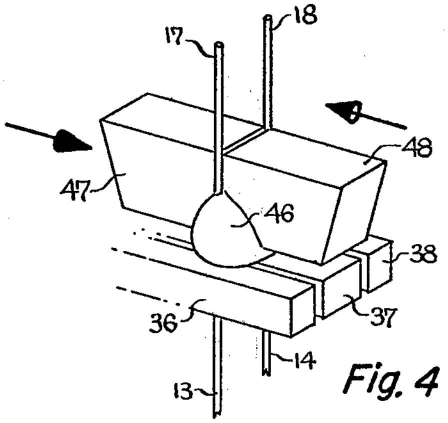
Fig. 4
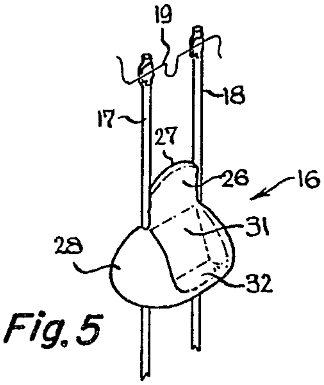
Fig. 5
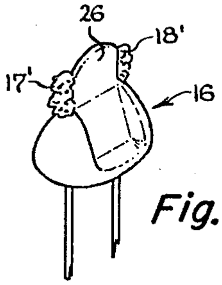
Fig. 6

METHOD OF MAKING A NON-SHORTING PHOTOFLASH LAMP

This is a division, of application Ser. No. 746,397, filed Dec. 1, 1976 now abandoned.

BACKGROUND OF THE INVENTION

The invention is in the field of photoflash lamps of the miniature type in which a pair of lead-in wires carry a filament or other electrical ignition means inside a bulb having a volume less than two cubic centimeters and containing combustion material such as shredded metal foil and a combustion-supporting gas such as oxygen. The lead-in wires extend into the bulb through a seal at the base of the bulb, and the lamps are conventionally positioned base-down when flashed in flashcubes and multiple flash arrays.

When such a photoflash lamp is flashed, the shredded metal foil burns in an oxygen atmosphere and produces an intense flash of light, accompanied by intense heat which melts back the lead-in wires from the ignition means. Occasionally, some remnants of metal will remain in a flashed lamp and tend to bridge across the melted-back wires, causing an electrically shorted flashed lamp. Also, the melted-back lead-in wires sometimes become distorted and touch one another, and/or melt and fuse together, causing a directly contacting short with one another. This shorting is undesirable in certain applications, such as in flash arrays like the FlashBar type of array in which flashed lamps must be non-shorted in order that the flash sequencing can function properly to cause flashing of subsequent lamps in the array.

Due to the small size of miniature flash lamps, it is not feasible to provide an internal glass stem to seal and support the lead-in wires within the bulb as had been the case with previous large-bulb flash lamps, because such an internal stem would be difficult to construct in such a small bulb and would considerably reduce the amount of space available for the oxygen. Therefore, miniature types of electrically fired flash lamps are conventionally constructed with a pair of lead-in wires sealed through a press-seal at the base of the bulb, and in some types, a small glass bead is sealed to the lead-in wires within the bulb to provide mechanical support and to facilitate the manufacturing process.

Various ways have been devised for making miniature electrically fired flash lamps which will be open-circuited, or at least not short-circuited, between the lead-in wires after having been flashed. U.S. Pat. No. 3,816,054 to Baldrige and Sobieski discloses a flash lamp having electrical insulation means, such as a glass sleeve around one of the lead-in wires, to provide an increased electrical path length between the melted-back lead-in wires after the lamp is flashed. U.S. Pat. Nos. 3,897,196 and 3,919,750 to Saunders and Leach disclose a flash lamp having a glass bead fused around the lead-in wires, the bead being pushed up at its bottom to provide a raised barrier at its top between the lead-in wires. U.S. Pat. No. 3,941,555 to Anderson and Sobieski discloses a flash lamp having a bead sealed to the lead-in wires and shaped to have sloping sides and a narrow ridge at the top extending between the lead-in wires, to prevent after-flash shorting by unburned metal strands deposited on the bead.

SUMMARY OF THE INVENTION

Objects of the invention are to provide improved photoflash lamps of the miniature type which will almost invariably be non-shorted across their lead-in wires after flashing, and to provide such flash lamps which are manufacturable by a feasible and inexpensive method.

The invention comprises, briefly and in a preferred embodiment, a flash lamp of the miniature type having a bulb, a pair of lead-in wires sealed into the bulb through a base region thereof, flash ignition means connected across the lead-in wires within the bulb, and a bead member sealed to the lead-in wires within the bulb and between the flash ignition means and the bulb's base region, the bead member being shaped to have a raised narrow ridge extending upwardly between the lead-in wires so that when the lamp flashes the lead-in wires will melt back at the sides of the raised ridge of the bead member. A preferred method of forming the bead member comprises placing material therefor at or around the lead-in wires, heating the material to a softened condition and squeezing the softened material with shaping jaws which force some of the softened bead material upwardly between the lead-in wires.

BRIEF DESCRIPTION OF THE DRAWING

FIG. 1 is a perspective view of a photoflash lamp in accordance with a preferred embodiment of the invention.

FIGS. 2, 3, and 4 illustrate steps in making a beaded flash lamp mount in accordance with a preferred method of the invention.

FIG. 5 is a perspective view of the mount as used in the flash lamp.

FIG. 6 is a perspective view of the mount of FIG. 5 after the lamp has been flashed.

DESCRIPTION OF THE PREFERRED EMBODIMENT

The lamp shown in FIG. 1 of the drawing is generally the same type as disclosed in the above-referenced patents, and comprises a tubular envelope 11, preferably made of a borosilicate glass or other suitable vitreous material having an enclosed volume of less than two cubic centimeters and having a stem press seal 12 at one end (the base end) thereof through which a pair of lead-in wires 13, 14 extend from the exterior to the interior of the bulb 11 in a substantially mutually parallel spaced apart manner. A bead 16 of glass or other suitable vitreous material secures the interior portions 17 and 18 of the leads 13 and 14 in spaced relationship to each other within the bulb 11, and a filament or other flash initiation means 19 which may be coated with suitable primer ignition material is held near the ends thereof by the interior ends of the leads 17 and 18 at a distance above the bead 16. Alternatively, primer material may be applied over the interior lead ends, instead of or in addition to being coated on the filament 19.

The bulb 11 is substantially filled with a loose mass of filamentary or shredded metal wire or foil 23 of zirconium or hafnium or other suitable combustible metal. Air is exhausted from the bulb 11, and the bulb is filled with oxygen at a pressure of at least several atmospheres, such as about 5 to 10 atmospheres, and the bulb is sealed off at an exhaust tip 24 at the other end thereof from the stem press seal 12. The lamp may be coated with the usual lacquer or plastic protective coating.

In accordance with the invention, the bead 16 is shaped to have a raised narrow ridge 26 extending upwardly between the interior portions 17 and 18 of the lead-in wires and having a narrow top edge 27 that is substantially straight and which extends partly or completely between the lead-in wires 17, 18. Preferably, the height of the ridge 26 is approximately the same as that of the rest or main body 28 of the bead 16, as shown in FIG. 5. The interior portions 17 and 18 of the lead-in wires extend upwardly from the main body 28 of the bead 16 and flank the side edges of the bead's raised ridge 26.

When the flash lamp is flashed, any unburned remnants of the combustible filamentary material 23 which fall on top of the bead will either slide off the bead, because of the narrow top edge 27 of the bead; or if they are caught over the bead and dangle or drape over the top edge 27, the orientation of this top edge will cause the filamentary remnants to be oriented laterally of the plane in which the lead-in wires 17 and 18 lie, so that such remnants will not contact against the lead-in wires 17, 18 and cause an undesired short circuit after the lamp is flashed. The foregoing functions and advantages of the narrow top bead edge 27 are further described and illustrated in the above-referenced patent of Anderson and Sobieski. Preferably, the sides 31 of the bead 16 below the raised ridge 26 slope outwardly toward the bottom of the bead so as to deflect falling unburned metal particles outwardly so they will fall to the bottom of the bulb away from the lead-in wires and hence will not cause an undesirable short circuit. Also, the bead 16 preferably is shaped to have outwardly extending shelves or shoulders 32 at the bottoms of the sloping sides 31, onto which shelves falling metal debris is likely to come to rest and hence not fall to the bottom of the bulb. The transition from the ridge 26 to the shoulders 32 can be more gradual than shown in the drawing. In connection with the just-described functionings of the bead in preventing short circuiting across the lead-in wires by unburned filamentary metal debris in the flashed lamp, there is some likelihood that the metal particles will be hot enough to stick to the bead and hence not reach the bottom of the bulb, and metal particles deflected sideways by the sloping bead sides 31 may strike the inside surface of the bulb and may be hot enough to stick thereto. All of the foregoing function and contribute to a reduced likelihood of after-flash shorting by unburned metal particles.

The invention also reduces, or eliminates, the possibility of after-flash shorting between the melted-back lead-in wires. As shown in FIG. 6, the lead-in wires melt back, from their ends at the filament 19, to form elongated masses or globules 17′ and 18′ flanking the side edges of the raised rib 26. Thus, the raised rib 26 functions as an insulative barrier between the melted-back lead-in wires and prevents them from touching one another which would form an undesirable after-flash short between the lead-in wires. The raised rib 26, by having its side edges adjacent to the lead-in wires, prevents them from bending towards each other while melting back, thus further insuring a non-shorted lamp after flashing.

From the foregoing description, it will be apparent that the invention achieves a dual role of preventing afterflash shorting due to melted-back lead-in wires and also due to falling unburned metal fragments.

A preferred method of the invention, shown in FIGS. 2–4, comprises the steps of holding the lead-in wires 13, 14 in a fixture or jaws 36, 37, 38, with their portions 17, 18 uppermost, placing a glass ring 39 (or a mound of powdered glass) around the wires and resting on the jaws 36, 37, 38 as shown in FIG. 2, heating the glass ring 39 with flames 41, 42 from burners 43, 44 to form a softened glob 46 of glass (FIG. 3), and squeezing the upper portion of the softened glass glob 46 at its region between the lead-in wires with a pair of shaping jaws 47, 48 (FIG. 4) to force a portion of the glass glob upwardly between the lead-in wires to form the raised rib 26, and allowing the formed glass glob to cool and solidify. The inner shaping faces of the jaws 47, 48 are shaped and positioned so as to simultaneously form the raised rib 26, the sloping sides 31, and the outwardly extending shoulders 32. The filament 19 is then attached to the lead-in wires and the mount is sealed into an end of the flashbulb envelope 11, and the rest of the lamp manufacture is carried out in known manner. In carrying out the step illustrated in FIG. 4, it is preferred that the forming jaws 47, 48 be no wider than the spacing between the lead-in wires, or not extend beyond the outer edges of the wires, so that the raised rib 26 will be formed only between the lead-in wires and not beyond their outer side edges, and the bottom surfaces of the jaws, at least where they contact the glass glob 46, are spaced from the lead-holding jaws 36–38 so that the outwardly extending shoulders 32 will be formed on the bead 16. The jaws 47, 48 may be advanced toward each other until they abut against the lead-in wires or until they meet resistance due to the confined raised portion of glass which forms the raised rib 26. Thus, the raised rib 26 is thin and is substantially no thicker than the diameters of the lead-in wires 13, 14, so as to facilitate shedding of falling metal particles when the lamp flashes. The top edge 27 of the raised rib 26 need not be straight in order to achieve the objects of the invention; it will tend to assume a curvature that is higher in the middle between the lead-in wires, as shown, due to the action of the forming jaws 46, 48, but it can be formed with a reverse curvature to that shown, or with other configurations depending on the configuration of the forming jaws and the forming technique employed.

While preferred embodiments and modifications of the invention have been shown and described, various other embodiments and modifications thereof will become apparent to persons skilled in the art and will fall within the scope of the invention as defined in the following claims. The words "top"and "bottom", etc., as used herein are to be construed in the customarily relative sense, the top and bottom of the lamp and the support bead therein remaining the same regardless of lamp orientation.

What we claim as new and desire to secure by Letters Patent of the United States is:

1. A method of making a miniature photoflash lamp, by making a beaded mount comprising the steps of holding a pair of elongated lead-in conductors in substantially mutually parallel spaced apart relationship, positioning insulative bead material at a location along said lead-in conductors, heating said bead material to a softening temperature, providing a pair of forming jaws which are no wider than the spacing between said lead-in conductors, and with said forming jaws squeezing a portion of the softened bead material which is only between said lead-in conductors so as to force a portion of the bead material to move in the plane defined by said lead-in conductors and form a narrow raised ridge only between and flanked by said lead-in conductors, and sealing said mount into an end of a tubular envelope with said bead material positioned within said envelope and said narrow ridge facing toward the other end of said tubular envelope, said raised ridge having the function when said lamp is flashed of permitting the lead-in conductors to melt back and form melted masses flanking the side edges of said raised ridge.

2. A method as claimed in claim 1, in which said lead-in conductors are held by holding means, said bead material being in the form of a ring positioned around said lead-in conductors and resting on said holding means.

3. A method as claimed in claim 1, in which said pair of jaws are moved toward said plane of the lead-in conductors until the inner surfaces thereof substantially abut against said lead-in conductors.

4. A method as claimed in claim 1, in which said jaws are shaped to form sloping sides on said bead which slope outwardly from said narrow ridge.

5. A method as claimed in claim 1, in which said jaws are shaped to form outwardly extending shoulders on said bead at the end thereof opposite from said narrow ridge.

* * * * *